(12) United States Patent
Sugahara

(10) Patent No.: US 9,822,428 B2
(45) Date of Patent: Nov. 21, 2017

(54) EXTRACTION/SEPARATION METHOD

(71) Applicant: Shin-Etsu Chemical Co., Ltd., Tokyo (JP)

(72) Inventor: Hiroto Sugahara, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 6 days.

(21) Appl. No.: 14/848,537

(22) Filed: Sep. 9, 2015

(65) Prior Publication Data

US 2016/0068930 A1 Mar. 10, 2016

(30) Foreign Application Priority Data

Sep. 10, 2014 (JP) ................. 2014-184316

(51) Int. Cl.
*C22B 59/00* (2006.01)
*C22B 3/26* (2006.01)
*C22B 34/14* (2006.01)

(52) U.S. Cl.
CPC ............ *C22B 59/00* (2013.01); *C22B 3/0005* (2013.01); *C22B 34/14* (2013.01); *Y02P 10/234* (2015.11)

(58) Field of Classification Search
None
See application file for complete search history.

(56) References Cited

U.S. PATENT DOCUMENTS 5,258,167 A    11/1993   Takahashi et al.

| | | |
|---|---|---|
| 2013/0102806 A1 | 4/2013 | Sakaki et al. |
| 2013/0123534 A1 | 5/2013 | Sakaki et al. |
| 2015/0184268 A1 | 7/2015 | Asano |

FOREIGN PATENT DOCUMENTS

| | | |
|---|---|---|
| EP | 2264196 A1 | 12/2010 |
| EP | 2540671 A1 | 1/2013 |
| EP | 2 592 067 A1 | 5/2013 |
| EP | 2 592 068 A1 | 5/2013 |
| EP | 2712940 A1 | 4/2014 |
| JP | 1-108119 A | 4/1989 |
| JP | 1-246328 A | 10/1989 |
| JP | 4-36373 A | 2/1992 |
| JP | 4-74711 A | 3/1992 |
| JP | 9-291320 A | 11/1997 |
| JP | 2012-12370 A | 1/2012 |
| JP | 2012-12371 A | 1/2012 |
| JP | 2013/190879 A | 9/2013 |

(Continued)

OTHER PUBLICATIONS

Office Action dated Jul. 5, 2016, issued in counterpart Kazakhstan Patent Application No. 2015/1025.1, with English translation. (6 pages).

(Continued)

*Primary Examiner* — Melissa Swain
(74) *Attorney, Agent, or Firm* — Westerman, Hattori, Daniels & Adrian, LLP

(57) ABSTRACT

The inventive extraction/separation method involves the step of contacting an organic phase containing a dialkyl-diglycol amic acid extractant: $R^1R^2NCOCH_2OCH_2COOH$ with an aqueous solution containing scandium and zirconium and/or hafnium for thereby extracting zirconium and/or hafnium into the organic phase. The purity of scandium can be efficiently increased by the simple step of solvent extraction.

4 Claims, 1 Drawing Sheet

(56) References Cited

FOREIGN PATENT DOCUMENTS

| JP | 2014-1430 A | 1/2014 |
| JP | 2014-012901 A | 1/2014 |
| WO | 97/36011 A1 | 10/1997 |

OTHER PUBLICATIONS

Search Report dated Jan. 22, 2016, issued in counterpart European Application No. 15182474.5-1362. (7 pages).
Kubota, et al., "Extraction/Separation Behavior of Rare Earth Metals with Novel Amie Acid Extractant", Abst. 31st Symposium on Rare Earths, The Rare Earth Society of Japan, 2014, pp. 44-45.
Office Action dated Apr. 12, 2017, issued in counterpart European patent application No. 15182474.5 (in English; 6 pages).
Yuji Sasaki et al., "Complexation and Back Extraction of Various Metals by Water-soluble Diglycolamide", Analytical Sciences, vol. 23, No. 6, published Jun. 10, 2007, pp. 727-731.

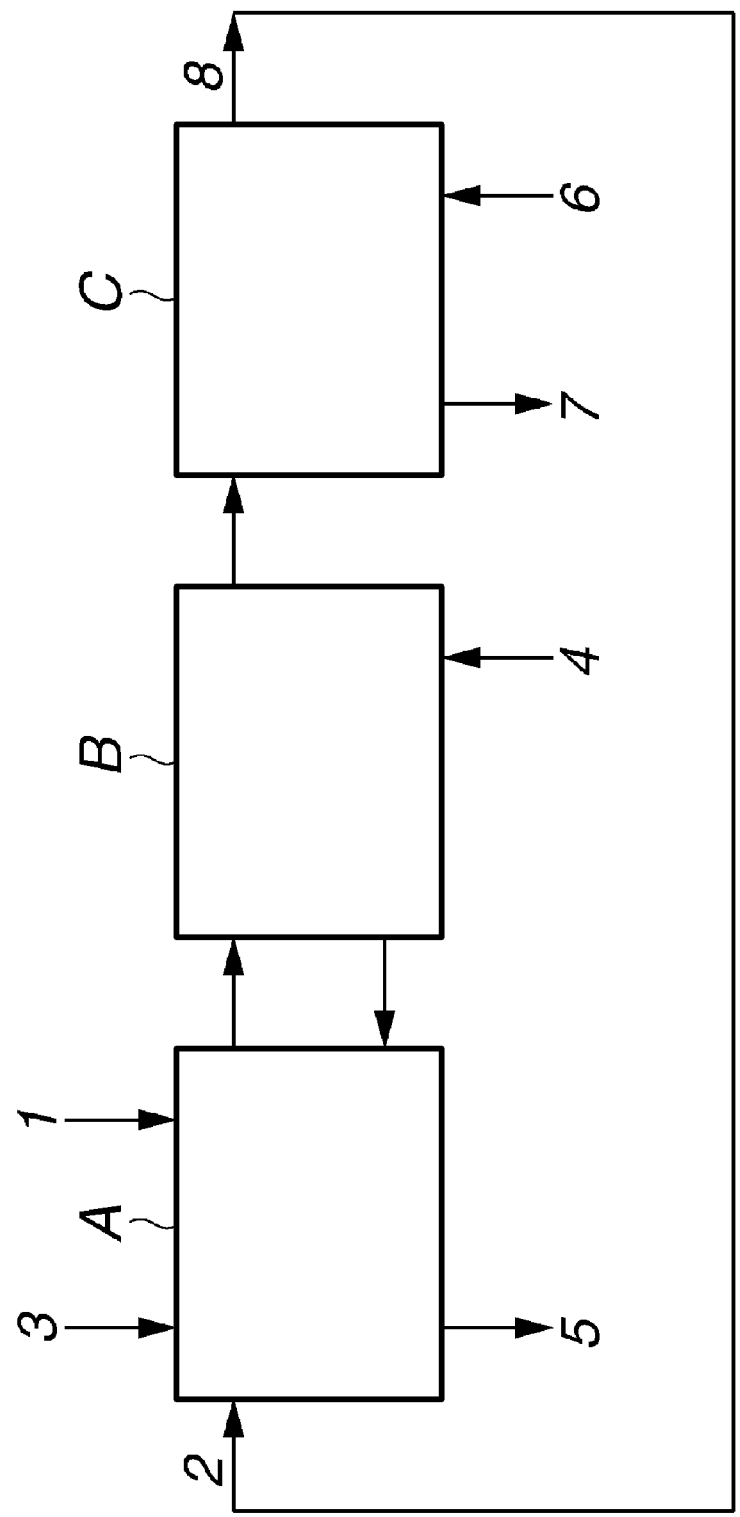

EXTRACTION/SEPARATION METHOD

CROSS-REFERENCE TO RELATED APPLICATION

This non-provisional application claims priority under 35 U.S.C. §119(a) on Patent Application No. 2014-184316 filed in Japan on Sep. 10, 2014, the entire contents of which are hereby incorporated by reference.

TECHNICAL FIELD

This invention relates to a method for separating zirconium and/or hafnium from an aqueous solution containing scandium and zirconium and/or hafnium by solvent extraction.

BACKGROUND ART

Unlike other rare earth elements, scandium due to its extremely small ion radius is rarely present in common rare earth minerals, but widely present in minor amounts in oxide minerals of aluminum, tin, tungsten, zirconium, iron, nickel, etc.

Since scandium has a low basicity due to the small ion radius, a strong acid is needed for its dissolution. When oxide minerals are dissolved with acid, many other elements are dissolved at the same time and coexist with scandium in the aqueous solution. Since the aqueous solution contains the main metal component from the oxide mineral in a high concentration, it is not easy to separate scandium from the aqueous solution.

One typical method known for scandium separation is solvent extraction using an acidic alkyl phosphate extractant such as PC-88A (Daihachi Chemical Industry Co., Ltd., main component: 2-ethylhexyl 2-ethylhexylphosphonate). Since PC-88A has an extremely high scandium trapping ability, back extraction is very difficult. Another method uses a carboxylic acid extractant, typically Versatic 10. In this case, extraction equilibrium is reached at or above pH 4, at which scandium hydroxide forms and interferes with extraction. Accordingly, there is a need for a method which can separate scandium efficiently.

CITATION LIST

Patent Document 1: JP-A H09-291320
Patent Document 2: JP-A H04-036373 (U.S. Pat. No. 5,258,167)
Patent Document 3: JP-A H01-108119
Patent Document 4: JP-A H01-246328
Patent Document 5: JP-A H04-074711
Patent Document 6: JP-A 2012-012370 (US 20130123534, EP 2592067)
Patent Document 7: JP-A 2012-012371 (US 20130102806, EP 2592068)
Patent Document 8: JP-A 2014-001430 (WO 2013/190879)
Patent Document 9: JP-A 2014-012901
Non-Patent Document 1: F. Kubota, et al., "Extraction/Separation Behavior of Rare Earth Metals with Novel Amic Acid Extractant", Abst. 31st Symposium on Rare Earths, The Rare Earth Society of Japan, 2014, pp. 44-45

DISCLOSURE OF INVENTION

An object of the invention is to provide a method for treating an aqueous solution containing scandium and zirconium and/or hafnium for efficiently increasing the purity of scandium.

In connection with an aqueous solution containing scandium as a first element and zirconium and/or hafnium as a second element, the inventor has found the step of contacting the aqueous solution containing the first and second elements, especially at or below pH 3 with an organic phase containing a dialkyldiglycol amic acid having the general formula (1):

$$R^1R^2NCOCH_2OCH_2COOH \quad (1)$$

wherein $R^1$ and $R^2$ are each independently a straight or branched alkyl group, at least one of $R^1$ and $R^2$ being an alkyl group of at least 6 carbon atoms, preferably dioctyldiglycol amic acid having formula (1) wherein both $R^1$ and $R^2$ are $C_4H_9CH(C_2H_5)CH_2$—as an extractant, for thereby extracting the second element, preferentially to the first element, from the aqueous solution into the organic phase. By this simple step, the purity of the first element, scandium can be increased.

In treatment of an aqueous solution containing scandium as a first element and zirconium and/or hafnium as a second element, the invention provides a method for separating the second element by solvent extraction, comprising the step of contacting the aqueous solution as an aqueous phase with an organic phase containing a dialkyldiglycol amic acid having the general formula (1):

$$R^1R^2NCOCH_2OCH_2COOH \quad (1)$$

wherein $R^1$ and $R^2$ are each independently a straight or branched alkyl group, at least one of $R^1$ and $R^2$ being an alkyl group of at least 6 carbon atoms, as an extractant, for thereby extracting the second element into the organic phase.

In a preferred embodiment, the aqueous solution is an acidic aqueous solution at or below pH 3.

In a preferred embodiment, the extractant is N,N-di-2-ethylhexyl-3-oxapentane-1,5-amic acid corresponding to formula (1) wherein both $R^1$ and $R^2$ are $C_4H_9CH(C_2H_5)CH_2$—. In a preferred embodiment, the step of contacting the aqueous solution with the organic phase is conducted in a countercurrent multistage mixer settler.

ADVANTAGEOUS EFFECTS OF INVENTION

Although it is difficult in the prior art to separate zirconium and/or hafnium from an aqueous solution containing scandium and zirconium and/or hafnium, the extraction/separation method of the invention is successful in selectively separating zirconium and/or hafnium from the aqueous solution. By the simple step, the purity of scandium can be efficiently improved. The capital investment and running cost can be reduced.

BRIEF DESCRIPTION OF DRAWINGS

FIG. 1 is a block diagram of a countercurrent multistage mixer settler.

DESCRIPTION OF PREFERRED EMBODIMENTS

The method of the invention starts with an aqueous phase which is an aqueous solution containing scandium as a first element and zirconium and/or hafnium as a second element. By the simple step of contacting the aqueous solution with an organic phase containing an extractant, the second element can be extracted and separated into the organic phase. After extraction, the purity of the first element, scandium in the aqueous solution is increased.

The extractant used herein is a dialkyldiglycol amic acid having the general formula (1):

$$R^1R^2NCOCH_2OCH_2COOH \quad (1)$$

wherein $R^1$ and $R^2$ are each independently a straight or branched alkyl group, at least one of $R^1$ and $R^2$ being an alkyl group of at least 6, preferably 6 to 18, and more preferably 7 to 12 carbon atoms. If both alkyl groups represented by $R^1$ and $R^2$ in formula (1) have less than 6 carbon atoms, the dialkyldiglycol amic acid (extractant) is less lipophilic so that the organic phase containing the same may lack stability, leading to vague separation between the organic and aqueous phases, and the extractant itself dissolves in an aqueous phase beyond the negligible level, failing to play its own role. Alkyl groups of excessively many carbon atoms may not contribute to improvements in basic performance such as extraction ability and separation ability despite an increased production cost. It is acceptable that when one of $R^1$ and $R^2$ has at least 6 carbon atoms, the other may have less than 6 carbon atoms, as long as the dialkyldiglycol amic acid remains lipophilic.

The more preferred dialkyldiglycol amic acid is one having formula (1) wherein both $R^1$ and $R^2$ are straight or branched alkyl groups of 8 carbon atoms. Examples of the amic acid include N,N-di-n-octyl-3-oxapentane-1,5-amic acid (referred to as DODGAA or dioctyldiglycol amic acid, hereinafter) corresponding to formula (1) wherein both $R^1$ and $R^2$ are n-octyl (n-$C_8H_{17}$—) and N,N-di-2-ethylhexyl-3-oxapentane-1,5-amic acid (referred to as D2EHDGAA or di-2-ethylhexyldiglycol amic acid, hereinafter) corresponding to formula (1) wherein both $R^1$ and $R^2$ are ethylhexyl ($C_4H_9CH(C_2H_5)CH_2$—), with D2EHDGAA being more preferred.

The organic phase consists essentially of the above dialkyldiglycol amic acid as an extractant and an organic solvent as a diluent in which the extractant is dissolvable. An organic solvent which has a low solubility in water, appropriately dissolves the extractant, has a low specific gravity, and helps enhance extraction ability is selected. Examples of the organic solvent include toluene, xylene, hexane, isododecane, kerosine, and higher alcohols (for example, of 5 to 10 carbon atoms). The organic phase preferably contains the extractant in a concentration of 0.1 to 1 mol/L, more preferably 0.3 to 0.7 mol/L.

In this invention, from an aqueous solution containing scandium (first metal) and zirconium and/or hafnium (second metal), the second metal as extract element is extracted into an organic phase containing the extractant (solvent extraction step). The first metal and the second metal, i.e., scandium and zirconium and/or hafnium to be treated with the extractant are contained in the aqueous phase in aqueous solution state, and may be present as an aqueous solution having water-soluble salts of the first and second metals dissolved therein. Examples of the water-soluble salt include chlorides (scandium chloride, zirconium chloride, and hafnium chloride), sulfates (scandium sulfate, zirconium sulfate, and hafnium sulfate), and nitrates (scandium nitrate, zirconium nitrate, and hafnium nitrate). According to the invention, an aqueous phase containing 0.1 to 0.7 mol/L, specifically 0.2 to 0.5 mol/L of the first metal and 0.001 to 0.05 mol/L, specifically 0.005 to 0.02 mol/L of the second metal can be treated. The aqueous phase containing only the first and second metals as metal components is preferred because after separation of the second metal from the aqueous phase by the extraction step, the first metal remains in the aqueous phase as the sole metal component. However, it is acceptable that the aqueous phase contains a metal or metals other than the first and second metals, such as sodium, potassium, and magnesium as long as the other metals are in an insufficient concentration to form precipitates. This is because such a low concentration of the other metal does not prevent the extraction step from extracting the second metal into the organic phase and keeping the first metal in the aqueous phase. In this case, the concentration of the other metal in the aqueous phase is preferably up to 0.001 mol/L.

In the extraction step, the aqueous phase is preferably at or below pH 3. Above pH 3, the first and/or second metal will form a hydroxide and become a precipitate, which may prevent extraction/separation when the aqueous phase is contacted with the organic phase, and cause a phase separation failure to the extraction step. If the pH is on a strong acid side, a large amount of acid is required for regeneration of the extractant after extraction of the second metal. Therefore, the aqueous phase in the extraction step is preferably at pH 1 to 3. A pH value in this range can be adjusted with an acid such as hydrochloric acid, sulfuric acid or nitric acid and an alkali such as sodium hydroxide or potassium hydroxide.

The ratio of an extractant concentration $C_o$ in the organic phase to a second metal concentration $C_A$ in the aqueous phase, i.e., $C_o/C_A$ (mole ratio) is preferably in the range: $3 \leq C_o/C_A \leq 500$. If $C_o/C_A < 3$, the concentration of the extractant, dialkyldiglycol amic acid is so low relative to the concentration of the second metal that the organic phase may coagulate, failing in separation by solvent extraction.

If $C_o/C_A > 500$, such extra extractant may not contribute to improvements in basic performance such as extraction ability and separation ability and may rather add to the cost because the concentration of the extractant in the organic phase is extremely higher than the concentration of the second metal in the aqueous phase.

In the invention, from the organic phase having the second metal extracted therein, the second metal may be back extracted by contacting the organic phase with a back extraction liquid, i.e., acid aqueous solution (back extraction step). By back extraction, the second metal can be recovered and also the extractant be regenerated. The back extraction liquid is an aqueous phase in the back extraction step and contains an acid such as hydrochloric acid, sulfuric acid or nitric acid. Although the back extraction liquid preferably contains only the acid, it may contain a metal component as long as it is an acid aqueous solution capable of back extraction. The acid concentration in the back extraction liquid is preferably 3 to 7N, more preferably 4 to 6N, and typically a strong acid below pH 1 is used. In this case, the back extraction liquid must contain the acid in an amount of at least 1 equivalent, preferably 3 to 5 equivalents per equivalent of the second metal in the organic phase subject to back extraction.

In the extraction and back extraction steps, the extraction layer (i.e., organic and aqueous phases) is typically controlled at a temperature lower than the flash point of the solvent which constitutes the organic phase. In general, a higher temperature of the extraction layer leads to a higher solubility of the extractant in the organic phase and better separation between organic and aqueous phases. However, to prevent a fire from being taken in excess of the flash point, the temperature should not exceed the flash point of the solvent. Preferably the extraction layer is controlled to a temperature lower than the flash point by 5° C. to 10° C.

In the extraction and back extraction steps, organic and aqueous phases may be contacted by any prior art well-known methods for solvent extraction. A countercurrent multistage mixer settler is advantageous for efficiently contacting an organic phase consisting of an extractant and an organic solvent with an aqueous phase which is an aqueous solution containing first and second elements or a back extraction liquid and conducting effective extraction and separation.

FIG. 1 shows a block diagram of a countercurrent multistage mixer settler. The mixer settler includes an extraction section A, a scrubbing section B, and a back-extraction section C, each of which may consist of one or multiple stages. The number of stages is properly selected such that the purity of the first metal may reach the desired level after extraction/separation. Lines 1 to 8 depict input and output flows to and from the mixer settler. The system feeds an aqueous phase (aqueous solution containing first and second metals) from line 1, an extractant-containing organic phase from line 2, an alkaline aqueous solution (e.g., sodium hydroxide aqueous solution) from line 3, and an acid aqueous solution (e.g., aqueous sulfuric acid) from lines 4 and 6. An aqueous phase containing residual first metal (not extracted into the organic phase) is recovered from line 5, and an aqueous solution (acid aqueous solution) in which the second metal once extracted into the organic phase is extracted back is recovered from line 7. In extracting section A, the pH of the aqueous phase is adjusted so that first and second metals are separated to the aqueous and organic phases, respectively. In extraction section A, an alkaline aqueous solution is added to the organic and aqueous phases from line 3. In scrubbing section B, the organic phase is scrubbed with an acid aqueous solution capable of selectively extracting only the first metal (a fraction of which is dissolved in the organic phase and which is to be left in the aqueous phase). In scrubbing section B, the acid aqueous solution is added to the organic phase from line 4. In back-extraction section C, the second metal once extracted in the organic phase is extracted back to the back extraction liquid (acid aqueous solution). In back-extraction section C, the back extraction liquid (acid aqueous solution) is added to the organic phase from line 6. The extractant from which the second metal has been extracted back may be recycled from line 8 to line 2 for reuse.

In extraction section A, aqueous phase 1 is contacted with organic phase 2 for extraction. The second metal in aqueous phase 1 is extracted into organic phase 2 whereas aqueous phase 5 containing the first metal (remaining therein without being extracted into organic phase 2) is recovered from extraction section A. Understandably, alkaline aqueous solution 3 is fed for the purpose of adjusting an equilibrium acid concentration. The organic phase 2 to which the second metal is extracted is fed to scrubbing section B where organic phase 2 is scrubbed with acid aqueous solution 4 which is pH adjusted so as to selectively extract the first metal (a fraction of which is dissolved in organic phase 2 and which is to be left in the aqueous phase). The acid aqueous solution 4 to which the first metal has been selectively extracted is fed to extraction section A whereas the scrubbed organic phase 2 is fed to back-extraction section C where the second metal in the organic phase 2 is back extracted with acid aqueous solution (back extraction liquid) 6 adjusted to the desired pH. The resultant aqueous solution 7 containing the second metal is recovered. The organic phase 8 from which the second metal has been back extracted is recycled to extraction section A at 2.

The concentration of the alkaline aqueous solution fed to extraction section A is typically 1 to 5 N, but not limited thereto. The concentrations of the acid aqueous solutions fed to scrubbing section B and back-extraction section C are each typically 3 to 7N, but not limited thereto. The amount of alkali in the alkaline solution added during extraction and the amount of acid in the acid aqueous solution used for back extraction are each preferably 1.2 to 3.5 equivalents, more preferably 1.3 to 2.9 equivalents per equivalent of the second metal in the aqueous phase.

EXAMPLE

Examples of the invention are given below by way of illustration and not by way of limitation.

Example 1

D2EHDGAA as an extractant was dissolved in kerosine to form a 0.5 mol/L D2EHDGAA solution, which was used as an organic phase. Scandium chloride, zirconium chloride, and hafnium chloride were dissolved in water to form a mixed aqueous solution containing 0.2 mol/L of scandium, 0.01 mol/L of zirconium, and 0.01 mol/L of hafnium, which was adjusted to pH 1 with sulfuric acid and used as an aqueous phase. A separatory funnel was charged with 100 ml of the organic phase and 100 ml of the aqueous phase, shaken at 20° C. for about 20 minutes to extract zirconium and hafnium, and allowed to stand until equilibrium was reached. The organic phase was separated from the aqueous phase. Next, 100 ml of the separated organic phase and 100 ml of 5N sulfuric acid aqueous solution (back extraction liquid) were fed into a separatory funnel, which was shaken at 20° C. for about 20 minutes to back extract zirconium and hafnium from the organic phase into the sulfuric acid aqueous solution.

The concentrations of scandium, zirconium and hafnium in the aqueous phase after extraction and in the sulfuric acid aqueous solution after back extraction were measured by an ICP emission spectrometer (ICP-7500 by Shimadzu Corp., the same applies hereinafter).

Comparative Example 1

Extraction and back extraction were carried out as in Example 1 except that PC-88A (Daihachi Chemical Industry Co., Ltd., main component: 2-ethylhexyl 2-ethylhexylphosphonate) was used as the extractant. The concentrations of scandium, zirconium and hafnium were measured.

Example 1 using D2EHDGAA had a separation factor of 81 as calculated from the measured zirconium and hafnium concentrations, indicating a good separation behavior.

Comparative Example 1 using PC-88A failed to separate scandium from zirconium and hafnium because scandium was extracted into the organic phase together with zirconium and hafnium.

Example 2

Using D2EHDGAA extractant, an aqueous solution containing scandium, zirconium and hafnium, and a countercurrent multistage mixer settler as shown in FIG. 1, zirconium and hafnium were extracted and separated from the aqueous solution.

Specifically, D2EHDGAA as the extractant was dissolved in kerosine to form a 0.5 mol/L solution which was used as an organic phase. Scandium chloride, zirconium chloride, and hafnium chloride were dissolved in water to form a mixed aqueous solution containing 0.2 mol/L of scandium, 0.01 mol/L of zirconium, and 0.01 mol/L of hafnium, which was adjusted to pH 1 with sulfuric acid and used as an aqueous phase.

The counterflow multistage mixer settler of FIG. 1 included an extraction section A of 5 stages, a scrubbing section B of 3 stages, and a back-extraction section C of 4 stages. The organic phase and aqueous phase were subjected to extraction/separation at 20° C. in the mixer settler. The aqueous phase was fed at a flow rate of 30 L/hr from line 1, the organic phase fed at 6.8 L/hr from line 2, 4N sodium hydroxide solution fed at 0.5 L/hr from line 3, 5N sulfuric acid aqueous solution fed at 0.04 L/hr from line 4, and 5N sulfuric acid aqueous solution fed at 0.1 L/hr from line 6. The aqueous phase after extraction was recovered at 30.6 L/hr from line 5, and the sulfuric acid aqueous solution after back extraction recovered at 0.1 L/hr from line 7.

After a steady state was reached, the organic phase was recovered from extraction section A and back extracted with 3N sulfuric acid aqueous solution. The concentration of scandium in the back extraction liquid was measured by an ICP emission spectrometer. The aqueous phase recovered from line 5 was also measured for concentrations of scandium, zirconium and hafnium by an ICP emission spectrometer.

The back extraction liquid had a scandium concentration of 0.0002 mol/L, and the aqueous phase had a scandium concentration of 1.5 mol/L, a zirconium concentration of 0.0001 mol/L, and a hafnium concentration of 0.0001 mol/L. The percentage of scandium based on the total amount of scandium, zirconium and hafnium in the aqueous phase was 99.9 mol %, and the percent retention of scandium in the aqueous phase was 99.9 mol %.

Comparative Example 2

Extraction and back extraction were carried out as in Example 2 except that PC-88A was used as the extractant. The concentrations of scandium, zirconium and hafnium were measured as in Example 2.

The back extraction liquid had a scandium concentration of 0.01 mol/L, and the aqueous phase had a scandium concentration of 0.02 mol/L, a zirconium concentration of 0.03 mol/L, and a hafnium concentration of 0.03 mol/L. The percentage of scandium based on the total amount of scandium, zirconium and hafnium in the aqueous phase was 25 mol %, and the percent retention of scandium in the aqueous phase was 25 mol %. A part of scandium was extracted into the organic phase together with zirconium and hafnium, and scandium back extracted from the organic phase was only 0.01 mol %, indicating that only a fraction of the scandium once extracted into the organic phase was back extracted. The results demonstrate that PC-88A is difficult to separate scandium from zirconium and hafnium.

Japanese Patent Application No. 2014-184316 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for separating a second element from an aqueous solution by solvent extraction, said aqueous solution containing scandium as a first element and each or both of zirconium and hafnium as the second element, the method comprising the step of contacting the aqueous solution as an aqueous phase with an organic phase containing a dialkyldiglycol amic acid having the general formula (1):

$$R^1R^2NCOCH_2OCH_2COOH \qquad (1)$$

wherein $R^1$ and $R^2$ are each independently a straight or branched alkyl group, at least one of $R^1$ and $R^2$ being an alkyl group of at least 6 carbon atoms, as an extractant, for thereby extracting the second element into the organic phase.

2. The method of claim 1 wherein the aqueous solution is an acidic aqueous solution at or below pH 3.

3. The method of claim 1 wherein the extractant is N,N-di-2-ethylhexyl-3-oxapentane-1,5-amic acid corresponding to formula (1) wherein both $R^1$ and $R^2$ are $C_4H_9CH(C_2H_5)CH_2$—.

4. The method of claim 1 wherein the step of contacting the aqueous solution with the organic phase is conducted in a countercurrent multistage mixer settler.

* * * * *